United States Patent
Lim et al.

(10) Patent No.: US 8,654,201 B2
(45) Date of Patent: Feb. 18, 2014

(54) METHOD FOR DEBLURRING AN IMAGE

(75) Inventors: Suk Hwan Lim, San Mateo, CA (US); D. Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1946 days.

(21) Appl. No.: 11/064,128

(22) Filed: Feb. 23, 2005

(65) Prior Publication Data
US 2006/0187308 A1 Aug. 24, 2006

(51) Int. Cl.
*H04N 5/228* (2006.01)
*H04N 5/235* (2006.01)
*B03B 7/00* (2006.01)

(52) U.S. Cl.
USPC ............... 348/208.4; 348/221.1; 348/362

(58) Field of Classification Search
USPC ............... 348/208.4, 208.99, 221.1, 362
See application file for complete search history.

(56) References Cited

U.S. PATENT DOCUMENTS

| 4,720,637 A | * | 1/1988 | Clark ........................... 348/340 |
| 5,509,086 A | * | 4/1996 | Edgar et al. ................... 382/167 |
| 2001/0021224 A1 | * | 9/2001 | Larkin et al. ............. 375/240.16 |
| 2006/0093234 A1 | * | 5/2006 | Silverstein .................... 382/255 |

* cited by examiner

*Primary Examiner* — Sinh Tran
*Assistant Examiner* — Tuan Le

(57) ABSTRACT

A method for deblurring an image. A first image is captured. A second image is captured, wherein the second image is more blurred and more exposed than the first image. The second image is deblurred based on the first image.

17 Claims, 4 Drawing Sheets

400

```
Calculate the Fourier transform of the
second image
410
           ↓
Calculate the Fourier transform of the
first image
420
           ↓
Calculate the ratio of the Fourier transform of
the second image to the Fourier transform
of the first image
430
           ↓
Derive the blur kernel based on the inverse
Fourier transform of the ratio
440
```

METHOD FOR DEBLURRING AN IMAGE

TECHNICAL FIELD

Embodiments of the present invention relate to the field of digital imaging. More specifically, embodiments of the present invention relate to a method for deblurring an image.

BACKGROUND ART

Digital imaging devices, such as digital cameras, allow users to take photographs and store them in digital form. In general, digital imaging devices capture images by exposing an optical sensor, such as a Charged Coupled Device (CCD), to a scene for a particular exposure time. As digital imaging technology advances, CCDs are able to capture images with greater resolution. The resolution of a digital camera refers to the number of pixels included in a captured image. For example, a three-megapixel digital camera takes an image that is divided into three million pixels. As the pixel size decreases, it is increasingly important to ensure that each pixel is exposed to a sufficient amount of light to capture the image. For instance, the exposure time may be increased to ensure that each pixel captures enough light.

In general, typical digital imaging devices do not have enough sensitivity to capture images in many low light situations. For example, a user may wish to take photos in a museum or at a performance. In many of these cases, the user is not permitted to use a flash when taking the picture. Typically, the digital imaging device will set a very long exposure time (e.g., several seconds) to ensure that enough light is captured. However, the digital imaging device typically captures motion blurred images because the user cannot hold the imaging device steady enough during the course of the exposure. Furthermore, the subject of the photo may also move during the exposure, further blurring the captured image.

Some digital imaging devices also provide users with telephoto options to zoom in on a scene, enabling the capture of a closer version of the scene. As the zoom factor for capturing an image increases, the exposure time is typically proportionally shortened. However, as the pixel sizes decreases in higher resolution imaging devices, the exposure time may not be proportionally shortened, or shortened at all, to ensure that enough light is captured.

In general, there is a trade-off between shorter exposure images and longer exposure images. A short exposure image is typically sharp, as there is little motion blur. However, short exposure images are also typically noisy, as the signal-to-noise-ratio is low for underexposed pixels. Signal-to-noise-ratio decreases as the pixels in the image sensors receive less photons and short exposure images may not receive sufficient photons to ensure high signal-to-noise-ratio. In contrast, a long exposure image is well exposed and less noisy. However, as described above, long exposure images are subject to motion blur, resulting in blurred images.

In the prior art, it has been proposed to capture two or more images, including a short exposure image and a long exposure image, and to select pixels of the two images based on motion detection. Once the two images are captured, it is determined whether there was any motion for each pixel. If there was any motion for a pixel, the short exposure pixel is selected, and if there was not motion for a pixel, the long exposure pixel is selected. The final image will include both under-exposed and noisy pixels from the short exposure image, and blurred pixels from the long exposure image. Thus, if there was movement for all pixels, the shorter exposure image, which is noisier than the long exposure image, is selected. This method is a passive approach, simply selecting pixels from the two images, and does not deblur either image.

DISCLOSURE OF THE INVENTION

Various embodiments of the present invention, a method for deblurring an image, are described. A first image is captured. A second image is captured, wherein the second image is more blurred and more exposed than the first image. The second image is deblurred based on the first image.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, components, and circuits have not been described in detail as not to unnecessarily obscure aspects of the present invention.

Figure 1:
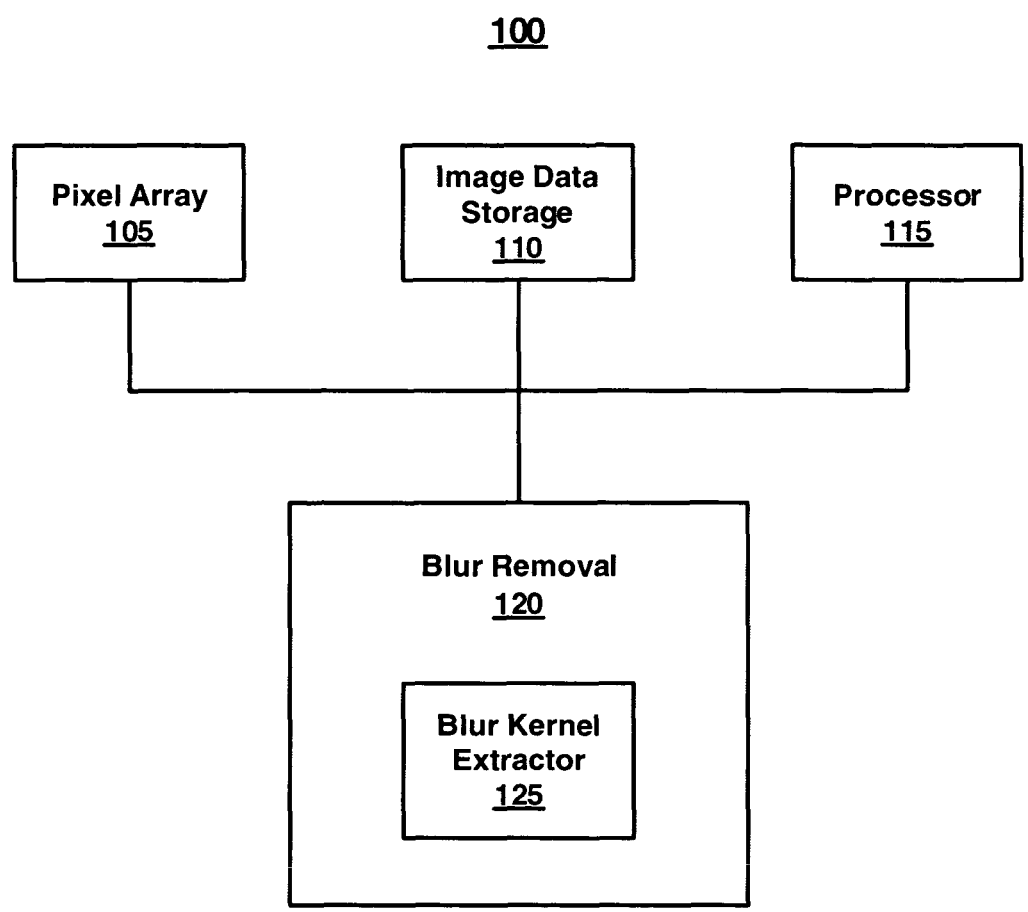
FIG. 1 is a block diagram of a system for deblurring an image, in accordance with an embodiment of the present invention.

FIG. 1 is a block diagram of a system 100 for deblurring an image, in accordance with an embodiment of the present invention. In one embodiment, system 100 is comprised within the imaging device. In one embodiment, the imaging device is a digital camera. However, it should be appreciated that the imaging device may be any electronic device that is capable of capturing images in a digital format, e.g., a digital camcorder with a still photo capture function.

System 100 is operable to capture two images, where one image is more blurred and more exposed than the other image. The less blurred and less exposed image is then used to deblur the more blurred and more exposed image. System 100 provides a sharp image with adequate exposure, reducing noise and blur.

System 100 includes pixel array 105, image data storage 110, processor 115, and blur removal 120. Pixel array 105 is operable to capture images. In one embodiment, pixel array 105 is a Charge Coupled Device (CCD). However, it should be appreciated that pixel array 105 may be any image sensor for capturing image data, such as a Complementary Metal Oxide Semiconductor (CMOS) image sensor. Captured image data is stored in image data storage 110. In one embodiment, image data storage 110 is a memory buffer.

In particular, system 100 is operable to capture two images, where the second image is more blurred and more exposed than the first image. It should be appreciated that the first image and the second image can be captured in any order, and that the labels first and second indicate different images, and does not refer to the order in which the images are captured.

In one embodiment, the first image is a short exposure image and the second image is a long exposure image, where the first image is captured using a shorter exposure time than the second image. The second image will typically include more motion blur than the first image. For example, the first image may have an exposure time of $1/60$ of a second, and the second image may have an exposure time of $1/10$ of a second. In one embodiment, the two images are captured in series. In one embodiment, the short exposure image is captured before the long exposure image. In another embodiment, the long exposure image is captured before the short exposure image. In another embodiment, the first image may be read off pixel array 105 at a point during the longer exposure of the second image (e.g., the short exposure image and the long exposure image overlap in time). Optionally, short exposure image may be read out after spatial subsampling.

In another embodiment, the first image is a small aperture image and the second image is a large aperture image, where the first image is captured using a smaller aperture size than the second image. The second image will typically include more focal blur than the first image. For example, the first image may have an aperture size (f-number) of f/64, and the second image may have an aperture size of f/2. In one embodiment, the two images are captured in series. In one embodiment, the small aperture image is captured before the large aperture image. In another embodiment, the large aperture image is captured before the small aperture image.

In one embodiment, blur removal 120 includes instructions that are accessible and executable by processor 115. Blur removal 120 may include any number and types of volatile and non-volatile storage devices such as RAM, hard disk drives, CD-ROM drives, and DVD drives. In other embodiments, blur removal 120 may include any combination of hardware and software components configured to perform the functions described herein.

Blur removal 120 is operable to deblur the more blurred and more exposed image based on the less blurred and less exposed image. For purposes of the following description the more blurred and more exposed image is referred to as the long exposure image and the less blurred and less exposed image is referred to as the short exposure image for clarity and simplicity. However, it should be appreciated that blur may be related to aperture size as well. In other words, while the invention is described with respect to deblurring motion blur, embodiments are also understood to deblur focal blur as well.

In one embodiment, blur removal 120 includes blur kernel extractor 125. System 100 executes blur kernel extractor 125 to provide the blur kernel for use in deblurring the long exposure image. The blurring process of the long exposure image can be modeled as the short exposure image convolved with the blur kernel. The blur kernel is generated based on both the short exposure image and the long exposure image.

Figure 2:
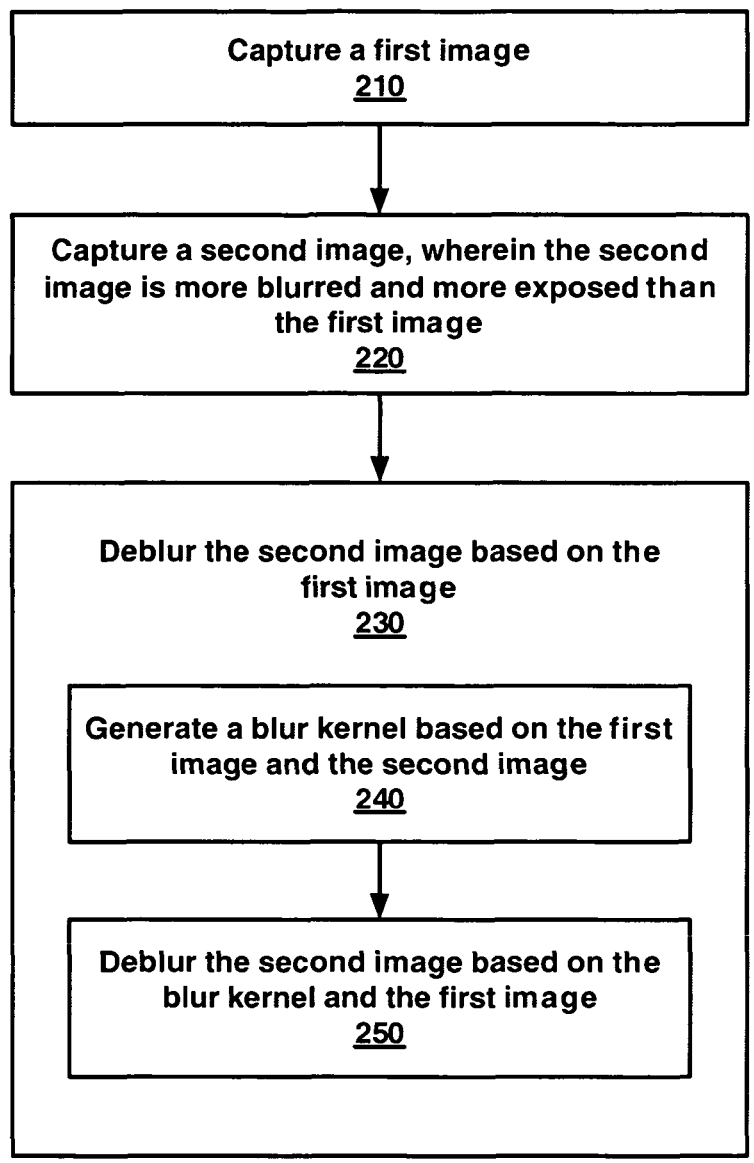
FIG. 2 is a flowchart of a process for deblurring an image, in accordance with an embodiment of the present invention.

The operation of system 100 is described with reference to FIG. 2. FIG. 2 is a flowchart of a process for deblurring an image, in accordance with an embodiment of the present invention. In one embodiment, process 200 is carried out by processor 115 under the control of computer-readable and computer-executable instructions (e.g., blur removal 120). The computer-readable and computer-executable instructions reside, for example, in data storage features such as computer usable volatile memory, computer usable non-volatile memory, and/or a data storage device of an imaging device. Although specific steps are disclosed in process 200, such steps are exemplary. That is, the embodiments of the present invention are well suited to performing various other steps or variations of the steps recited in FIG. 2.

At step 210 of process 200, a short exposure image is captured. At step 220, a long exposure image is captured, wherein the long exposure image is more blurred and more exposed than the short exposure image. It should be appreciated that the short exposure image and long exposure image may be captured in any order and/or may overlap in time.

At step 230, the long exposure image is deblurred based on the short exposure image at blur removal 120. In one embodiment, as shown at step 240, a blur kernel is generated based on the short exposure image and the long exposure image.

Figure 3:
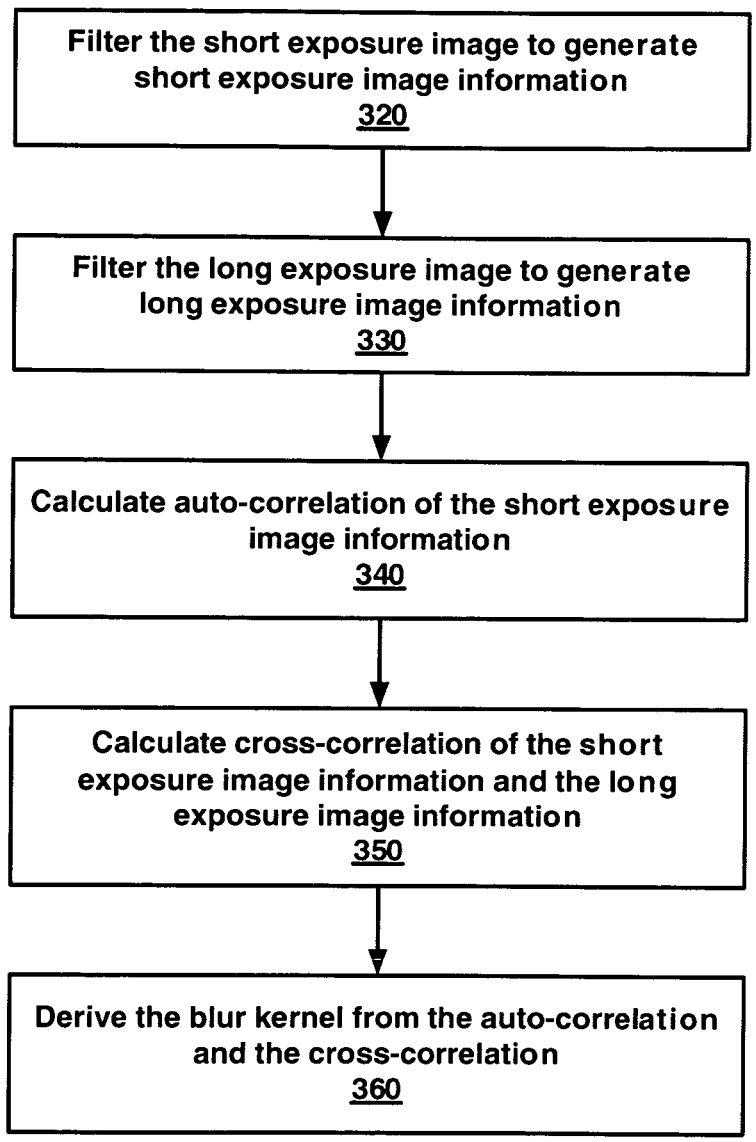
FIG. 3 is a flow chart illustrating a process for generating a blur kernel from a short exposure image and a long exposure image, in accordance with an embodiment of the present invention.

FIG. 3 is a flow chart illustrating a process 300 for generating a blur kernel from a short exposure image (e.g., first image) and a long exposure image (e.g., second image) as referenced in step 240 of FIG. 2, in accordance with an embodiment of the present invention. The method of FIG. 3 may be performed by system 100 using blur kernel extractor 125 and the short exposure image and the long exposure image.

At step 320, system 100 optionally executes a filter to filter the short exposure image to generate short exposure image information. At step 330, system 100 optionally executes a filter to filter the long exposure image to generate long exposure image information.

In one embodiment, the short exposure image information includes the unmodified pixel values of the short exposure image, and the long exposure image information includes the unmodified pixel values of the long exposure image. In this embodiment, the functions of steps 320 and 330 may be omitted. In another embodiment, the short exposure image information includes the spatial derivative or Laplacian of the short exposure image, and the long exposure image information includes the spatial derivative or Laplacian of the long exposure image.

At step 340, blur kernel extractor 125 calculates an auto-correlation of the short exposure image information. At step 350, blur kernel extractor 125 calculates a cross-correlation between the short exposure image information and the long exposure image information. At step 360, blur kernel extractor 125 derives the blur kernel based on the auto-correlation and the cross-correlation. In one embodiment, the blur kernel is derived using the least-squares method.

Figure 4:
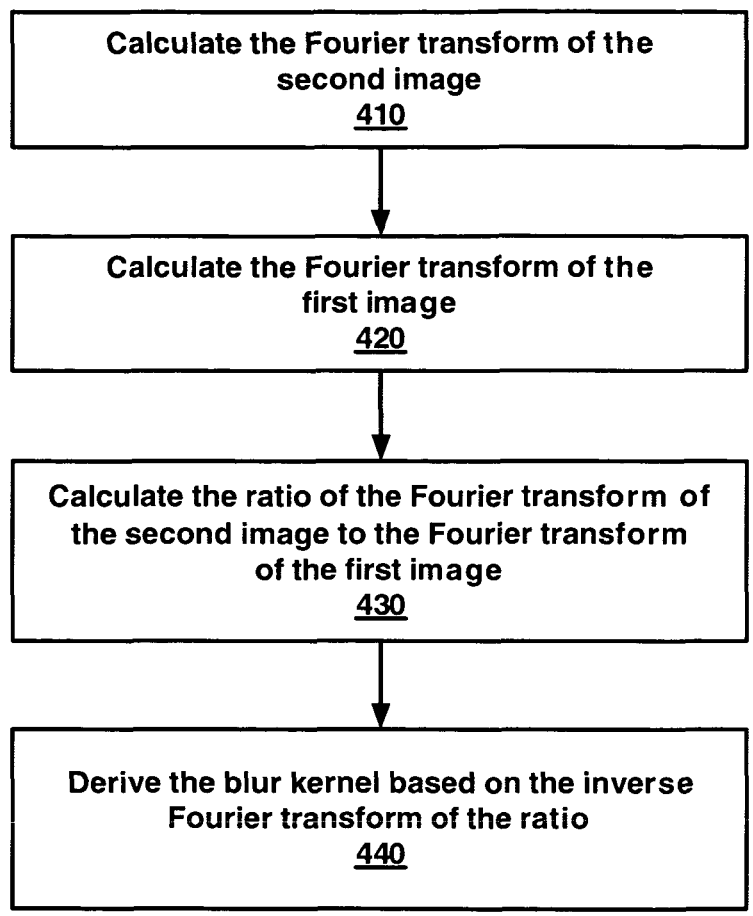
FIG. 4 is a flow chart illustrating a process for generating a blur kernel from a short exposure image and a long exposure image, in accordance with another embodiment of the present invention.

FIG. 4 is a flow chart illustrating a process 400 for generating a blur kernel from a short exposure image (e.g., first image) and a long exposure image (e.g., second image) as referenced in step 240 of FIG. 2, in accordance with another embodiment of the present invention. The method of FIG. 4 may be performed by system 100 using blur kernel extractor 125 and the short exposure image and the long exposure image.

Many blurring processes occurring in typical imaging devices can be modeled as a two-dimensional convolution. Where short exposure image (iS) is blurred by a blur kernel (h) to yield a long exposure image (iL), the process can be modeled as iL=iS*h+N, where N is the noise and '*' is the two-dimensional convolution operator. At step 410 of process 400, the Fourier transform of the long exposure image, F{iL}, is calculated. At step 420 of process 400, the Fourier transform of the short exposure image, F{iS}, is calculated. It should be appreciated that in another embodiment, the Fourier transforms of the spatial derivatives of the long exposure image and the short exposure image may be calculated. Furthermore, it should be appreciated that steps 410 and 420 may occur in series or in parallel, and may be occur any order.

At step 430, the ratio of the Fourier transform of the long exposure image to the Fourier transform of the short exposure image is calculated. At step 440, the blur kernel is derived based on the inverse Fourier transform of the ratio, as shown in Equation 1:

$$h = F^{-1}\left\{\frac{F\{iL\}}{F\{iS\}}\right\} \quad (1)$$

With reference to FIG. 2, at step 250, the long exposure image is deblurred based on the blur kernel and the short exposure image. In one embodiment, the short exposure image is used to regularize the deblurring of the long exposure image. The short exposure image (iS) and long exposure image (iL) can be represented as shown in Equations 2 and 3:

$$iS = l + n1 \quad (2)$$

$$iL = l*h + n2 \quad (3)$$

where l is the noise-free image, h is the blur kernel and n1 and n2 are the image noise. It is noted that l, iS and iL are normalized by exposure time. The deblurring is posed as a second order minimization problem; Find j that minimizes:

$$e = \|iL - h*j\|^2 + \lambda\|iS - j\|^2 \quad (4)$$

where $\lambda$ is a regularization parameter (constant), and $\|a-b\|^2$ is the squared-difference between images a and b. Equation 4 attempts to find the deblurred image that does not deviate too much from the short exposure image. Optionally, short exposure image can be filtered (to remove noise) before this process.

A closed form solution of the second order minimization problem of Equation 4 is represented in Equation 5:

$$\hat{j} = F^{-1}\left\{\frac{F\{h\}^* F\{iL\} + \lambda F\{iS\}}{F\{h\}^* F\{h\} + \lambda}\right\} \quad (5)$$

where c* represents a complex conjugate of c. It should be appreciated that the deblurring can be regularized such that the gradient of the deblurred image does not deviate from the gradient of the short exposure image.

In summary, in its various embodiments, the present invention provides for deblurring an image. Two images are captured, where the first image is less blurred, noisier and less exposed than the second image. The second image is deblurred based on the first image, resulting in an image that is sharp, well-exposed and with low noise. In other words, the described invention provides an optimized image based on the first image and the second image.

Various embodiments of the present invention, a method and system for deblurring an image, are described herein. While the present invention has been described in particular embodiments, it should be appreciated that the present invention should not be construed as limited by such embodiments, but rather construed according to the following claims.

What is claimed is:

1. A method, comprising:
    capturing a first image;
    capturing a second image, wherein said second image is more blurred and more exposed than said first image;
    generating a blur kernel based on said first image and said second image, wherein the blur kernel models blur in said second image, and said generating of said blur kernel comprises calculating a Fourier transform of said first image, calculating a Fourier transform of said second image, calculating of a ratio from said Fourier transform of said second image and said Fourier transform of said first image, and deriving the blur kernel based on an inverse Fourier transform of said ratio; and
    producing a deblurred image based on a deblurring of said second image with said blur kernel, wherein the deblurring is regularized based on said first image and a regularization parameter that constrains deviation of the deblurred image from said first image.

2. The method as recited in claim 1, wherein said capturing of said first image comprises capturing said first image using a shorter exposure time than said second image.

3. The method as recited in claim 1, wherein said capturing of first image comprises capturing said first image using a smaller aperture size than said second image.

4. The method as recited in claim 1, wherein said deblurring comprises deblurring said second image according to a regularized second order minimization by calculating a deblurred image that does not substantially deviate from said first image.

5. The method of claim 1, wherein said deblurring comprises determining an image j that minimizes:

$$\|iL - h*j\|^2 + \lambda\|iS - j\|^2$$

where iS is an image derived from the first image, iL is an image derived from the second image, h is the blur kernel, * represents a convolution process, and $\lambda$ is a regularization parameter.

6. A method, comprising:
    capturing a first image;
    capturing a second image, wherein said second image is more blurred and more exposed than said first image;
    generating a blur kernel based on said first image and said second image, wherein the blur kernel models blur in said second image, wherein said generating said blur kernel comprises calculating an auto-correlation of said second image, calculating a cross-correlation between said first image and said second image, and deriving said blur kernel based on said auto-correlation and said cross-correlation; and
    producing a deblurred image based on a deblurring of said second image with said blur kernel, wherein the deblurring is regularized based on said first image and a regularization parameter that constrains deviation of the deblurred image from said first image.

7. A non-transitory computer-usable medium having computer-readable program code embodied therein for causing a computer system to perform a method, said method comprising:
    capturing a first image;
    capturing a second image, wherein said second image is more blurred and more exposed than said first image;
    generating a blur kernel based on said first image and said second image, wherein the blur kernel models blur in said second image, and said generating comprises calculating a Fourier transform of said first image, calculating a Fourier transform of said second image, calculating of a ratio from said Fourier transform of said second image and said Fourier transform of said first image, and deriving the blur kernel based on an inverse Fourier transform of said ratio; and producing a deblurred image based on a deblurring of said second image with said blur kernel, wherein the deblurring is regularized based on said first image and a regularization parameter that constrains deviation of the deblurred image from said first image.

8. The computer-usable medium as recited in claim 7, wherein said capturing comprises capturing said first image using a shorter exposure time than said second image.

9. The computer-usable medium as recited in claim 7, wherein said capturing comprises capturing said first image using a smaller aperture size than said second image.

10. The computer-usable medium as recited in claim 7, wherein said deblurring comprises deblurring said second image according to a regularized second order minimization by calculating a deblurred image that does not substantially deviate from said first image.

11. The computer-usable medium of claim 7, wherein said deblurring comprises determining an image j that minimizes:

$$\|iL - h*j\|^2 + \lambda\|iS - j\|^2$$

where iS is an image derived from the first image, iL is an image derived from the second image, h is the blur kernel, * represents a convolution process, and $\lambda$ is a regularization parameter.

12. A non-transitory computer-usable medium having computer-readable program code embodied therein for causing a computer system to perform a method, said method comprising:

capturing a first image;

capturing a second image, wherein said second image is more blurred and more exposed than said first image;

generating a blur kernel based on said first image and said second image, wherein the blur kernel models blur in said second image wherein said generating comprises calculating an auto-correlation of said second image, calculating a cross-correlation between said first image and said second image, and deriving said blur kernel based on said auto-correlation and said cross-correlation; and producing a deblurred image based on a deblurring of said second image with said blur kernel, wherein the deblurring is regularized based on said first image and a regularization parameter that constrains deviation of the deblurred image from said first image.

13. A system, comprising:

a computer-readable medium storing computer-readable instructions; and a data processing unit coupled to the computer-readable medium, operable to execute the instructions, and based at least in part on the execution of the instructions operable to perform operations comprising capturing a first image and a second image, wherein said second image is more blurred and more exposed than said first image;

generating a blur kernel based on said first image and said second image, wherein the blur kernel models blur in said second image; and deblurring said second image with said blur kernel based on said first image, wherein in said deblurring the data processing unit is operable to perform operations comprising determining an image j that minimizes:

$$\|iL - h*j\|^2 + \lambda\|iS - j\|^2$$

where iS an image derived from the first image, iL is an image derived from the second image, h is the blur kernel, * represents a convolution process, and $\lambda$ is a regularization parameter.

14. The system as recited in claim 13, wherein in said capturing the data processing unit is operable to perform operations comprising capturing said first image using a shorter exposure time than said second image.

15. The system as recited in claim 14, wherein in said capturing the data processing unit is operable to perform operations comprising capturing said first image is captured using a smaller aperture size than said second image.

16. The system as recited in claim 13, wherein in said generating said data processing unit is operable to perform operations comprising:

calculating an auto-correlation of second image;

calculating a cross-correlation between said first image and said second image; and deriving said blur kernel based on said auto-correlation and said cross-correlation.

17. The system as recited in claim 13, wherein in said generating said data processing unit is operable to perform operations comprising:

calculating a Fourier transform of said first image;

calculating a Fourier transform of said second image;

calculating a ratio from said Fourier transform of said second image and said Fourier transform of said first image; and deriving the blur kernel based on an inverse Fourier transform of the ratio.

\* \* \* \* \*

UNITED STATES PATENT AND TRADEMARK OFFICE
CERTIFICATE OF CORRECTION

PATENT NO. : 8,654,201 B2
APPLICATION NO. : 11/064128
DATED : February 18, 2014
INVENTOR(S) : Suk Hwan Lim et al.

Page 1 of 1

It is certified that error appears in the above-identified patent and that said Letters Patent is hereby corrected as shown below:

In the Claims:

In column 8, line 19, in Claim 13, delete "iS" and insert -- iS is --, therefor.

In column 8, line 27, in Claim 15, delete "14," and insert -- 13, --, therefor.

Signed and Sealed this
Tenth Day of June, 2014

Michelle K. Lee
*Deputy Director of the United States Patent and Trademark Office*